United States Patent
Altherr et al.

[11] Patent Number: 5,878,861
[45] Date of Patent: Mar. 9, 1999

[54] PARK/NEUTRAL GEARBOX CONTROL MECHANISM

[75] Inventors: August Altherr, Kaiserslautern; Volker Hueckler, Radolfzell; Michael Teich, Mannheim, all of Germany

[73] Assignee: Deere & Company, Moline, Ill.

[21] Appl. No.: 868,690

[22] Filed: Jun. 4, 1997

[30] Foreign Application Priority Data

Jun. 5, 1996 [DE] Germany .............. 196 22 514.0

[51] Int. Cl.$^6$ .................................. F16H 63/02
[52] U.S. Cl. ........................ 192/220.1; 74/473.2
[58] Field of Search ...................... 192/4 C, 4 A, 192/220.1; 74/473.2, 473.24, 473.26

[56] References Cited

U.S. PATENT DOCUMENTS

| | | | |
|---|---|---|---|
| 3,729,074 | 4/1973 | Anderson et al. | 192/4 C |
| 3,780,839 | 12/1973 | Schroeder | 192/4 A |
| 4,222,469 | 9/1980 | Kubolis et al. | 192/4 A |
| 4,246,989 | 1/1981 | Kohler . | |
| 4,296,846 | 10/1981 | Benson | 192/4 C X |
| 4,462,273 | 7/1984 | Yoshii et al. | 74/473.2 X |
| 4,496,035 | 1/1985 | Wanie | 192/4 C |
| 4,625,842 | 12/1986 | King | 192/4 C |
| 4,796,736 | 1/1989 | Fee et al. | 192/4 C |
| 5,040,649 | 8/1991 | Okada | 192/4 A |
| 5,062,510 | 11/1991 | Shimizu | 192/4 C |
| 5,094,326 | 3/1992 | Schemelin et al. | 192/4 C X |
| 5,613,584 | 3/1997 | Bremner et al. . | |

FOREIGN PATENT DOCUMENTS 36 36 978.0  6/1989  Germany .

Primary Examiner—Rodney H. Bonck

[57] ABSTRACT

A vehicle gearbox has a rotatable actuator shaft having forward, neutral and reverse positions corresponding to forward, neutral and reverse operational modes of the gearbox. A control mechanism includes a first control lever operatively coupled to the actuator shaft for selecting a forward, neutral or reverse mode of the gearbox, a locking lever operable to actuate a parking lock, a second control lever coupled to the locking lever to control engagement and disengagement of the parking lock, and a device responsive to the second control lever for placing the gearbox in neutral when the parking lock is engaged. The device includes an actuator lever non-rotatably fixed to and extending radially from the actuator shaft and linkages coupled between the locking lever and the actuator lever for moving the actuator shaft into its neutral position when the parking lock is engaged.

10 Claims, 3 Drawing Sheets

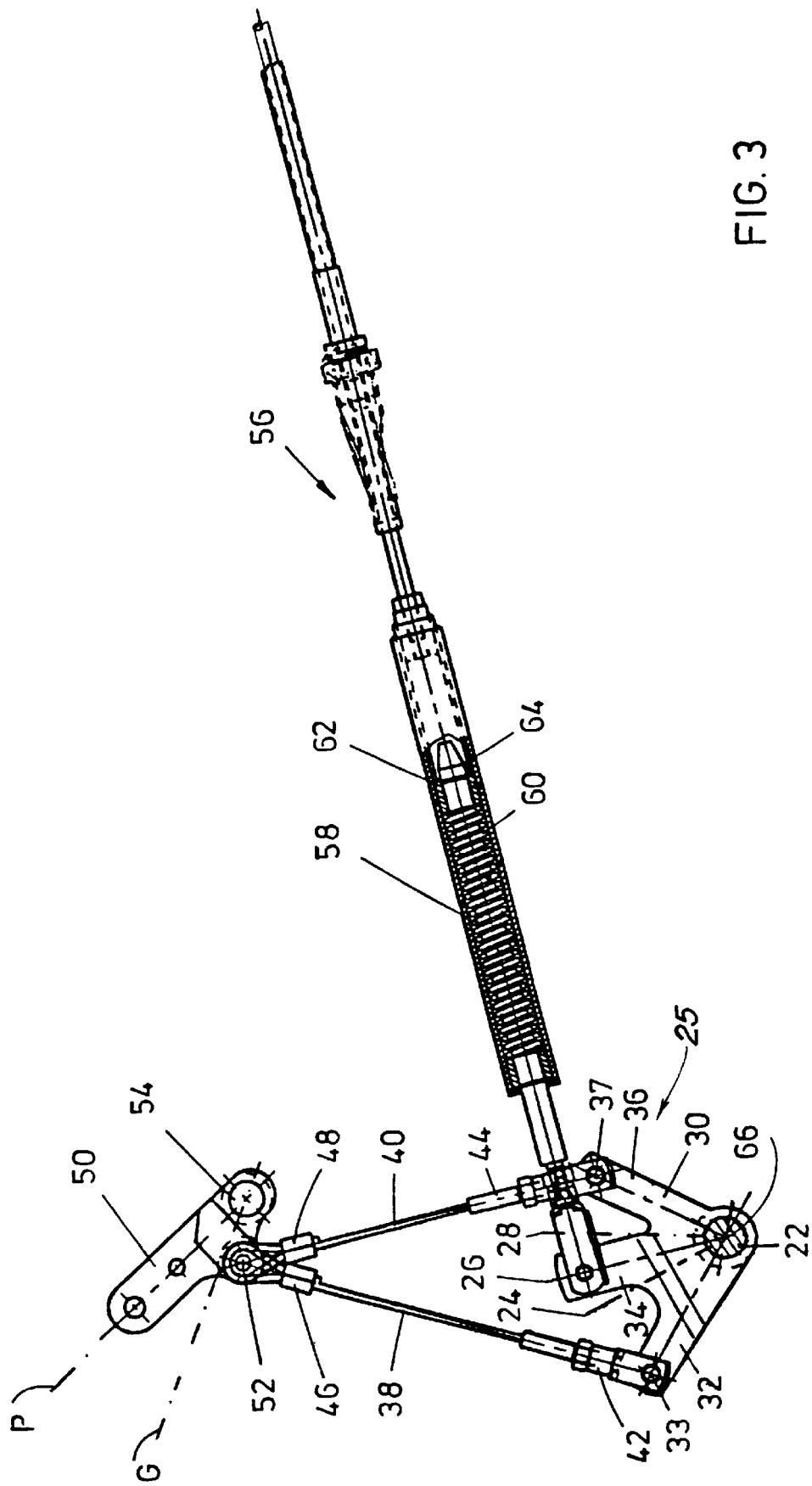

PARK/NEUTRAL GEARBOX CONTROL MECHANISM

BACKGROUND OF THE INVENTION

The invention to a gearbox of an agricultural or industrial vehicle, in particular, an agricultural tractor.

It is known practice to equip utility vehicles with parking locks. The parking lock is to be applied during parking or stationary use in order to prevent the vehicle from rolling away. This can be attained, for example, by a locking lever mechanism, which applies a positive lock to a set of gear teeth connected to a shaft so as to prevent rotation of the shaft in the parking position.

DE-PS-36 36 978 shows a parking lock for an automatic transmission, in particular, in connection with utility vehicles. Here a parking gear, in a one-piece configuration with an output shaft, is locked by means of a locking arm so that rotation of the output shaft during parking is not possible.

The lever that operates the parking lock may be configured as an independent operating element. However, agricultural tractors are known in which the operation of the parking lock is integrated into a gearshift lever which is used to select various gear ratios. Furthermore a second lever permits the selection of the direction of operation. This so-called reverse gearshift lever is preferably attached to the steering column within reach of the left hand. It permits shifting between a forward, neutral or reverse position.

With the use of a parking operating lever and a separate gear ratio or vehicle direction selector lever, the gear ratio or the vehicle direction selector lever is not inevitably forced into its neutral position, when the parking lock is engaged and the vehicle is stopped. Therefore it is possible that during a renewed starting of the vehicle the operator overlooks the fact that a gear ratio is already engaged or a selection of the direction of operation has been made. If the operator now disengages the parking lock, the vehicle begins to move forward or in reverse, unintended and unexpected by the operator. This can lead to dangerous situations.

U.S. Pat. No. 4,246,989 shows an arrangement for the locking of a gearbox operating element and a conventional brake with brake linings that can be actuated by a hydraulic cylinder and that open against the force of a spring when pressure is applied. The gearbox operating element can be moved axially for shifting between two opposite directions of operation and a neutral position and extends within a housing provided with a stop with axially opposed end faces. Alongside the stop a scissors-shaped arrangement is located that consists of two angular levers, the points of the knees of which are supported in joints in the housing. The ends of each of the first leg of the angular levers are connected to each other in a joint by a connecting pin. The second legs of the angular levers extend approximately parallel to each other and are drawn towards each other by a extension spring, so that they are in contact on both sides with the end faces of the stop and force the gearbox operating element into its central neutral position. To release the gearbox operating element a piston arrangement is provided which is actuated by the brake pressure. With increasing brake pressure the piston is moved and presses against the connecting joint of the two first legs. Thereby the angular levers are pivoted so that the scissors open against the force of the spring whereupon the two second legs move away from one another. This permits a free movement of the gearbox operating element.

The known locking mechanism is appropriate only for an application with a hydraulically actuated brake. It exhibits a relatively expensive configuration. Furthermore it is possible to move the gearbox operating element against the force of the extension spring out of its neutral position, which could be a disadvantage for applications with a parking lock.

SUMMARY OF THE INVENTION

An object of this invention is to provide a gearbox control mechanism wherein a forward, neutral, reverse selector lever is placed in its neutral position when the parking lock is engaged.

This and other objects are achieved by the present invention, wherein a mechanism of the aforementioned type includes a few, simple components which make it possible to lock the operating devices in their neutral position when the parking lock is engaged. The mechanism is applicable to a multi-lever actuation of gearbox and parking lock. With this mechanism the operating safety is improved in that the operator is required to intentionally select the direction of operation upon starting the vehicle.

The operating arrangement contains a first operating element which acts upon operating devices for the selective setting of the gearbox into a neutral position or in at least one gear ratio position, and a second operating element that is used at least for the engagement and disengagement of a parking lock. Furthermore means for locking of the operating devices by the second operating element are provided through which the operating devices move to their neutral position when the parking lock is engaged. The operating devices are retained in their neutral position as long as the second operating element persists in its park position.

The solution according to the invention does not permit the operator to set in motion the vehicle, for example, an agricultural tractor, if only the parking lock is disengaged after starting the vehicle engine. Rather, in order to start the vehicle moving, after disengaging the parking lock, the operator must move the first operating element out of its neutral position into one of its gear ratio positions, for example, into a forward or reverse operating direction position. Since with the movement of the second operating element into its park position, the first operating element (vehicle direction lever) jumps automatically into its neutral safety position. The operator must therefore intentionally move the first operating element out of its neutral position into the desired gear ratio or vehicle direction position when starting up again. If the operator attempts to select a direction of operation with the first operating element when the second operating element has engaged the parking lock, then the first operating element, which is preferably pre-loaded by a spring, jumps again and again into its neutral position or is retained in this position. Only with the parking lock disengaged can a direction of operation be permanently selected with the first operating element.

The operating arrangement according to the invention can be manufactured with few, simply configured components. It operates mechanically so that electrical or hydraulic supply circuits can be eliminated. It leads to an increase in operating safety, since operating errors are avoided.

The solution according to the invention permits the establishment of a mechanical connection between the first operating element used to select the direction of operation and the second operating element used for the parking lock, even though the operating elements are separated in space. Since the rotating transmitting shaft is compelled to shift into its neutral position, when the second operating element is brought into its parking lock position, the operator must intentionally select a direction of operation at the first operating element after releasing the second operating element, in order to start operating.

In order to bring the transmitting shaft into a neutral position, forces are applied to it that bring it from a random position forcefully into a neutral position. With a transmitting shaft that can move from its neutral position in two opposite directions, it is advantageous to apply two forces with opposing force components to the transmitting shaft, in order to bring it into its neutral position.

Shift forces are applied to the transmitting shaft, which is supported in bearing, free to rotate, at a radial distance from the axis of rotation, so that a lever arm develops between the joint and the axis, through which the torque necessary to rotate the operating element can be developed.

Preferably the first operating element is a reverse gearshift lever (reverser) with the possibility of selecting forward, neutral or reverse. Here the locking devices are configured in such a way that, upon engaging the parking lock, they rotate the transmitting shaft from its then prevailing forward or reverse position into its neutral position. The reverse gearshift lever can appropriately be attached to the left of the steering column of the vehicle so that it can be operated by the left hand of the operator.

The second operating element is preferably configured as a gearshift selector lever for the selection of various gear ratios of a gearbox. In addition to the gear ratio positions the gear ratio selector lever can be brought into a neutral position and a park position which engages the parking lock.

No separate new component needs to be introduced for a locking lever that can be controlled by the second operating element. Rather an intermediate lever of the parking and starting linkage can be used as locking lever that can be pivoted about an axis and fitted correspondingly, which is provided with a joint outside the axis which engages the transmitting means.

The transmitting lever that is fastened to the transmitting shaft is preferably provided with two joints located at differing angles of rotation of the transmitting shaft, each of which engages transmitting means in such a way that the transmission of force is possible through which the transmitting shaft can be rotated out of a forward or reverse position into a central neutral position.

In order to transmit the necessary forces it is advantageous that tension arrangements be provided as transmitting means which are preferably configured as rope pull arrangements. By appropriately routing the rope this can conform flexibly to the available space. Other possibilities can also be applied as transmitting means, for example, the application of chains, lever combinations, cylinder arrangements among others.

The tension arrangements are attached with each of their first ends to differing joints of the transmitting lever of the transmitting shaft. With each of their second ends the tension arrangements engage a lever, preferably through a common joint, that can be shifted by the second operating element, through which the parking lock can be engaged and disengaged. Thereby a direct coupling between parking lock and transmitting shaft can be attained.

A further preferred embodiment of the invention provides that the transmitting means contain at least one connecting bracket one end of which engages the locking lever and the other end engages the transmitting lever. The connecting bracket is provided with at least one elongated hole in which one of the joints can move so as to slide up to a stop.

As has been noted, the transmitting shaft should be retained in its neutral position when the parking lock is engaged. If in this case the operator attempts to move the first operating element out of its neutral position, then tension or compression forces are transmitted through the connecting linkage to the transmitting shaft. In order to avoid any damage to the operating arrangement by excessive tension or compression forces, a preferred embodiment of the invention provides that the transmitting means contain at least one pre-loaded extension spring one end of which is hooked into a joint of the locking lever and whose other end is hooked into a joint of the transmitting lever. At least one end of the extension spring is provided with a loop that extends in the longitudinal direction of the spring, in which one of the joints can move so as to slide up to a stop. The extension spring may be a pre-loaded helical spring wound to its solid height. Preferably it is designed in such a way that its length remains constant at lower tension loads and extends with increasing tension force when a predetermined spring pre-load is exceeded.

To absorb greater tension and compression forces it may be advantageous to insert a spring arrangement with at least one pre-loaded spring element between the first operating element and the transmitting lever. Here the spring element is designed in such a way that its length remains constant at lower tension and compression forces and can be reduced or increased when a predetermined spring pre-load is exceeded. This configuration protects the arrangement from overloads if the operator attempts to apply excessive force to move the first operating element out of its neutral position, as long as the transmitting shaft is locked in its neutral position.

In a simple configuration that is particularly appropriate for shifted gearboxes the transmitting lever, which is applied to the transmitting shaft, contains three legs where the outer pair of legs is located, for example, at an angle of approximately 90 to each other, but may also be located at other appropriate angles. Each of the outer legs engages one end of a transmitting means, for example, a rope pull or an extension spring each of whose other ends is fastened to a locking lever. The locking lever is actuated by the second operating element. The center leg of the transmitting lever, which, for example, is located midway between the two outer legs, engages the transmitting linkage, which leads to the first operating element. This linkage is preferably tangential, since that results in a particularly favorable transmission of force and the transmitting linkage is loaded only in tension and compression but not in bending.

BRIEF DESCRIPTION OF THE DRAWINGS

FIG. 3 shows a locking mechanism; and

DETAILED DESCRIPTION

Figure 1:
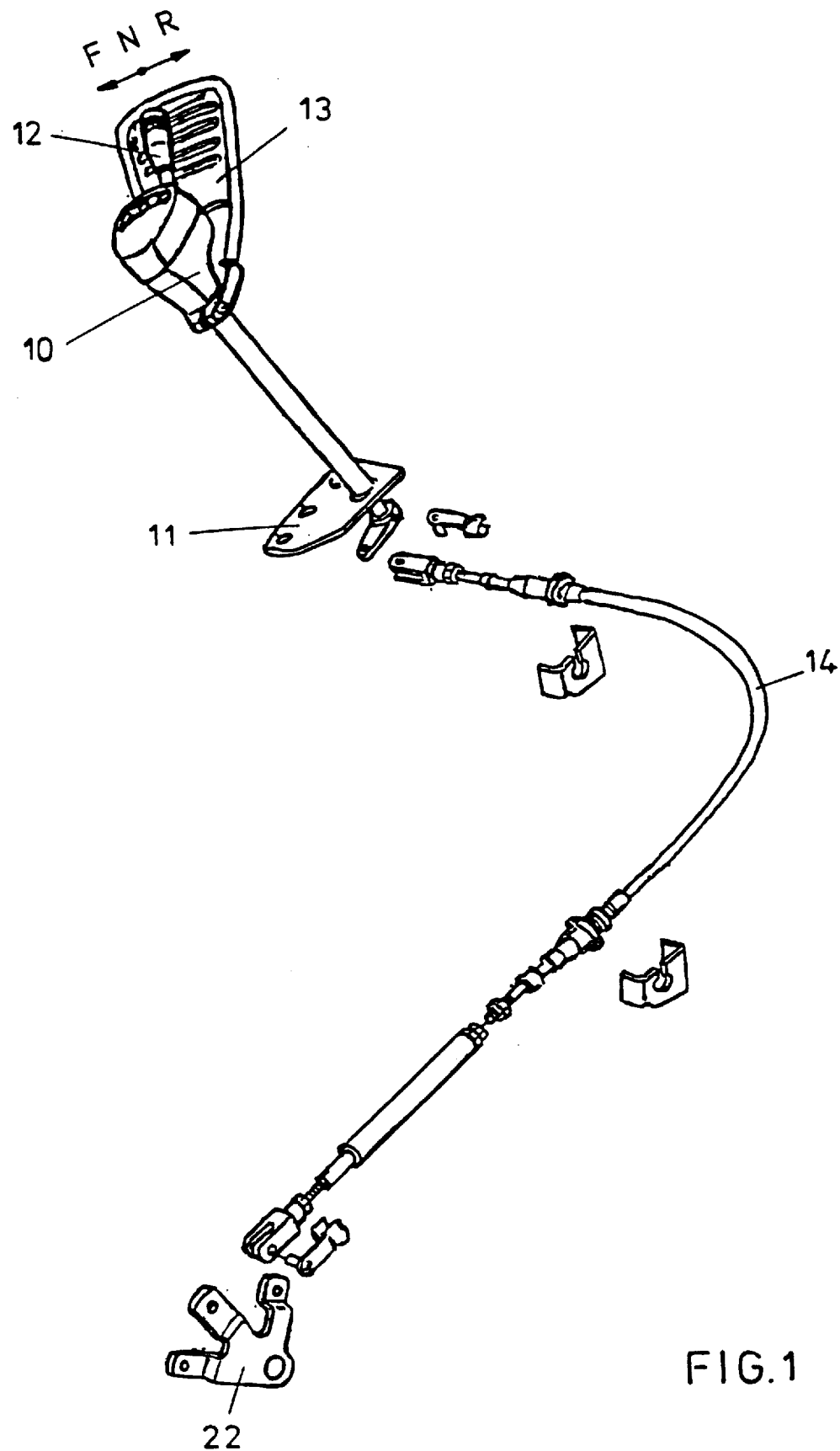
FIG. 1 is a perspective view of a linkage mechanism between a mode control lever and a lever which is coupled to a forward-neutral-reverse control shaft of a gearbox.

FIG. 1 shows a mode control lever 12 that is supported in bearings, free to rotate, in a guide housing 10. The guide housing 10 is mounted through an attachment plate 11 on the left side of a steering column (not shown) of an agricultural tractor (not shown). It carries a protective device 13 that is to protect the mode control lever 12 during operation against unintentional shifting. The mode control lever 12 is movable from a central, neutral position N into a forward position F and a reverse position R. The mode control lever 12 is coupled by a cable 14 to a transmitting lever 30 which is described in greater detail later in connection with FIG. 3.

Figure 2:
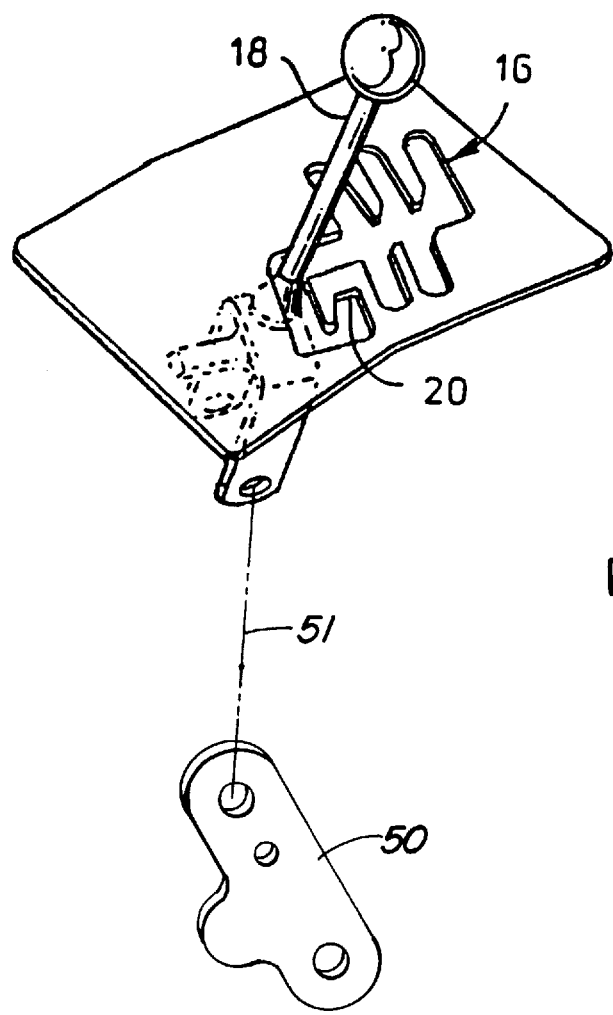
FIG. 2 is a perspective view of a vehicle gear shift lever and shift gate.

Referring to FIG. 2, a shift gate 16 guides a shift lever 18. Lever 18 is used to select various transmission ratios or gear ratio steps. The gate 16 includes a park position 20 into which the lever 18 may be placed in order to engage a parking lock (not shown). The shift gate 16 is preferably located near the region of the right hand of the operator.

Referring to FIG. 3, there is shown a mechanism 25 for setting a gearbox into its neutral position and for functionally connecting the shift lever 18 with the mode control lever 12. When the operating lever 18 is in the park position 20 the mechanism 25 guarantees that the mode control lever 12, the lever 30 and a mode control shaft 22 are in a central, neutral position. The mode control shaft 22 is rotatably supported by bearings (not shown) and is coupled to the gearbox (not shown), and can be pivoted between a forward position 24, a reverse position 28 and a central, neutral position 26, in order to shift the gearbox (not shown) between forward, reverse or neutral and to control the direction of operation of the vehicle.

The lever 30 is non-rotatably fixed to the shaft 22, and the lever includes three legs 32, 34, 36 which extend radially away from the axis of rotation and which lie in a plane. The two outer legs 32, 36 enclose between them an angle of approximately 90 degrees. Center leg 34 is located between the two outer legs 32, 36.

A cable 38 has an end 42 coupled to leg 32 at joint 33. A cable 40 has an end 44 coupled to leg 36 at joint 37. Each of the other ends 46, 48 of the cables 38, 40 engage a common joint 52 of a locking lever 50. The lever 50 is supported in bearings, free to rotate, about an axis 54, while the joint 52 is spaced apart from the axis 54. As best seen in FIG. 2, the lever 50 is an connected to lever 18 by a linkage 51. The lever 50 is also connected to a parking lock arrangement (not shown) and a shifted gearbox (not shown). If the operating lever 18 is moved by the operator into its park position 20 or is brought out of it, then the lever 50 is pivoted between its park position P and an unlocked position G, in which a gear ratio is engaged.

The center leg 34 of the lever 30 is coupled to transmitting linkage 56, which are connected via cable 14 to the mode control lever 12 of FIG. 1, so that the transmitting shaft 22 can be pivoted by means of the mode control lever 12 between its three positions 24, 26, 28. The linkage 56 includes a spring arrangement 58 which includes a helical spring 60 as well as an outer tube 62 and an inner tube 64.

Figure 4:
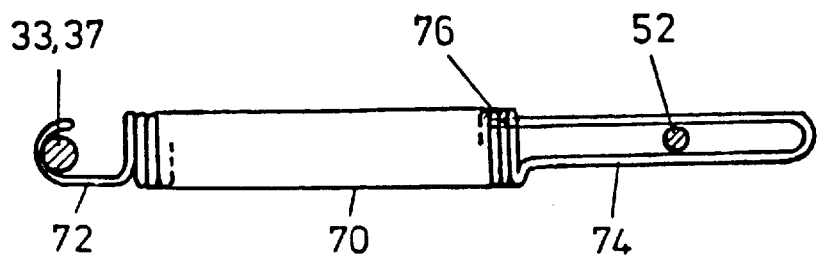
FIG. 4 shows an extension spring.

As shown in FIG. 4, an extension spring 70 could be used instead of the cables 38, 40 of FIG. 3. The extension spring 70 includes a central, helical spring section that blends into loops 72, 74 at each end. The coils of the spring section are wound to solid height in such a way that the extension spring 70 has a predetermined pre-load. The two loops 72, 74 of the extension spring 70 are hooked into the joints 33, 37 of the lever 30 and the joint 52 of the intermediate lever 50. The loop 74 extends in longitudinal direction, so that a relative movement between the loop 74 and the joint 52 is possible between the central position shown and a stop position in which the joint 52 is located at the outer end of the loop. The wire end 76 of the loop 74 extends into the spring section, whereby bending to open the loop 74 is avoided.

MODE OF OPERATION

The structure described herein provides a functional connection between the operating lever 18 and the mode control lever 12, and is responsive to whether the parking lock is engaged or disengaged.

The mode control lever 12 operates through the linkage 56 and the lever 30 upon the shaft 22. The movement of the mode control lever 12 pivots the lever 30 and thereby the shaft 22 about its axis of rotation 66 into its various positions 24, 26, 28. The linkage 56 engages the center leg 34 approximately at a right angle with respect to the center axis of leg 34.

The spring arrangement 58 within the linkage 56 is inoperative during normal shifting operations. That is, during normal shifting the spring 60 is not streatched or compressed, since it is designed so that it is compressed or stretched only by forces greater than the normal shifting forces.

When the operating lever 18 is moved its park position 20 to engage the parking lock, the lever 50 is pivoted upward about its axis 54 (as seen in FIG. 3) into its park position P, thereby applying tension to the cables 38, 40. The tension forces applied to the cables 38, 40 act upon the transmitting lever 30 and force it into its central, neutral position 26.

The forces transmitted by the cables 38, 40 and applied to the transmitting lever 30 compose a force parallelogram, in which, in each case, a force component is applied tangentially to each outer leg 32, 36. These force components oppose rotation of the shaft 22 away from its neutral position 26. Consequently, the shaft 22 occupies its neutral position 26 when the lever 18 is in its park position 20. As long as the lever 18 remains in its park position 20, the shaft 22 is held in its neutral position due to the force components transmitted by the cables 38, 40. The mode control lever 12 is connected through the linkage 56 to the lever 30 and follows the movement of the latter into the neutral position.

If, while the shaft 22 is in the neutral position 26, the operator attempts to select a forward or reverse direction of operation by means of the mode control lever 12, then an additional tangential force component is applied to the central leg 34 of the transmitting lever 30 which attempts to rotate the transmitting shaft 22 in opposition to the force components acting through the cables 38, 40. This could lead to an unnecessary load on various components, in particular the cables 38, 40 and to early wear and breakage of the latter. The spring arrangement 58 within the linkage 56 absorbs these forces and provides overload protection. The spring arrangement 58 is designed in such a way that its layout and the spring constant of the spring 60 do not permit the spring 60 to deflect under forces (for example, up to 12 Kg) that occur during normal shifting. Only under abusive operation of the mode control lever 12, in which the usual shift forces can be exceeded by a factor of ten, does the spring 60 deflect and absorbs the overload forces.

The extension spring 70 embodiment operates as follows:

If the intermediate lever 50 occupies its unlocked position G, then the joint 52 is located in the central region of the loop 74 and the extension spring 70 does not transmit any forces from the intermediate lever 50 to the lever 30. If the intermediate lever 50 is then pivoted into its park position P, then the joint 52 slides outward in the loop 74 until it makes contact with the bent end of the loop. Now a force is transmitted over the extension spring 70 from the intermediate lever 50 to the lever 30, which moves the lever 30 into its central, neutral position 26.

During this process the coils of the extension spring 70 normally remain at their solid height condition and the spring is rigid. Only when a force is transmitted through the mode control lever 12 to the lever 30, which exceeds the normal shift force of, for example, 12 Kg., then the extension spring 70 stretches and permits a momentary rotation of the shaft 22 out of its neutral position. If the operator again releases the mode control lever 12, then it moves along with the lever 30 and with the shaft 22, again into its neutral position, due to the force of the spring 70. If the spring 70 is employed, the linkage 56 can eliminated.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims. For example it is possible to replace the cables 38, 40 or the extension spring 70 with other means, which are able to transmit forces, to reset the operating devices to their neutral position. The application, for example, of chains, push-pull control cables, gas springs among others could be considered.

We claim:

1. A control mechanism for controlling a vehicle gearbox actuator shaft rotatable among forward, neutral and reverse positions corresponding to forward, neutral and reverse operational modes of a gearbox, the control mechanism comprising:

a first operating element operatively coupled to the actuator shaft and movable between forward, neutral and reverse positions;

a locking lever movable to a park position to engage a parking lock;

a second operating element coupled to the locking lever and movable to a park position;

an actuator lever non-rotatably fixed to the actuator shaft and having an arm extending radially from the actuator shaft; and a linkage coupled between the locking lever and the actuator lever, the linkage and the actuator lever moving the actuator shaft into its neutral position when the locking lever is moved to its park position, the linkage comprising a first link and a second link, the actuator lever comprising a first arm coupled to the first link and a second arm coupled to the second link, the first and second arms extending in different directions from a rotation axis of the actuator shaft.

2. The control mechanism of claim 1, wherein:

the second operating element is movable within a gate to a plurality of gear ratio positions, and to its park position.

3. The control mechanism of claim 1, wherein:

the linkage is coupled to the locking lever at a first joint; and the locking lever comprises an intermediate lever of a parking linkage, and the locking lever is rotatable about an axis which is spaced apart from the first joint.

4. The control mechanism of claim 1, wherein:

the linkage comprises a tension mechanism which shifts the actuator shaft into its neutral position when the parking lock is engaged.

5. The control mechanism of claim 1, wherein:

the linkage comprises a cable having a first end connected to the locking lever and a second end connected to the actuator lever, the cable being loose when the locking lever is not in its park position and being under tension when the locking lever is in its park position.

6. The control mechanism of claim 1, wherein:

a spring arrangement is coupled between the first operating element and the actuator shaft, the spring arrangement comprising a pre-loaded spring element, the spring element having a length which remains constant at lower tension and compression forces and which changes when a predetermined spring pre-load is exceeded.

7. The control mechanism of claim 1, wherein:

a spring arrangement is coupled between the first operating element and the actuator lever, the spring arrangement comprising a pre-loaded spring element, the spring element having a length which remains constant at lower tension and compression forces and which changes when a predetermined spring pre-load is exceeded.

8. A control mechanism for controlling a vehicle gearbox actuator shaft rotatable among forward, neutral and reverse positions corresponding to forward, neutral and reverse operational modes of a gearbox, the control mechanism comprising:

a first operating element operatively coupled to the actuator shaft and movable between forward, neutral and reverse positions;

a locking lever movable to a park position to engage a parking lock;

a second operating element coupled to the locking lever and movable to a park position;

an actuator lever non-rotatably fixed to the actuator shaft and having an arm extending radially from the actuator shaft; and a linkage coupled between the locking lever and the actuator lever, the linkage and the actuator lever moving the actuator shaft into its neutral position when the locking lever is moved to its park position, the linkage comprising a pair of cables having first ends coupled via a common joint to the locking lever and having second ends coupled via two different joints to the actuator lever.

9. A control mechanism for controlling a vehicle gearbox actuator shaft rotatable among forward, neutral and reverse positions corresponding to forward, neutral and reverse operational modes of a gearbox, the control mechanism comprising:

a first operating element operatively coupled to the actuator shaft and movable between forward, neutral and reverse positions;

a locking lever movable to a park position to engage a parking lock;

a second operating element coupled to the locking lever and movable to a park position;

an actuator lever non-rotatably fixed to the actuator shaft and having an arm extending radially from the actuator shaft; and a linkage coupled between the locking lever and the actuator lever, the linkage and the actuator lever moving the actuator shaft into its neutral position when the locking lever is moved to its park position, the linkage comprising a pre-loaded extension spring, one end of which is coupled to the locking lever and another end of which is coupled to the actuator lever, one of said ends comprising an elongated loop which is slidably coupled to the corresponding lever.

10. A control mechanism for controlling a vehicle gearbox actuator shaft rotatable among forward, neutral and reverse positions corresponding to forward, neutral and reverse operational modes of a gearbox, the control mechanism comprising:

a first operating element operatively coupled to the actuator shaft and movable between forward, neutral and reverse positions;

a locking lever movable to a park position to engage a parking lock;

a second operating element coupled to the locking lever and movable to a park position;

an actuator lever non-rotatably fixed to the actuator shaft and having an arm extending radially from the actuator shaft, the actuator lever comprising a first outer leg, a center leg and a second outer leg, each of said legs extending generally radially from an axis of the actuator shaft, said legs lying in a plane, and said outer legs being oriented at approximately a right angle to each other, and the center leg being located between the outer legs and being coupled to the first operating element; and a linkage coupled between the locking lever and the actuator lever, the linkage and the actuator lever moving the actuator shaft into its neutral position when the locking lever is moved to its park position, the linkage being coupled to the outer legs of the actuator lever.

* * * * *